United States Patent [19]

Ikeda et al.

[11] Patent Number: 4,686,544

[45] Date of Patent: Aug. 11, 1987

[54] LIQUID JET RECORDING HEAD

[75] Inventors: Masami Ikeda, Machida; Makoto Shibata; Hiroto Takahashi, both of Hiratsuka; Hiroto Matsuda, Ebina, all of Japan

[73] Assignee: Canon Kabushiki Kaisha, Tokyo, Japan

[21] Appl. No.: 674,659

[22] Filed: Nov. 26, 1984

[30] Foreign Application Priority Data

Nov. 30, 1983 [JP] Japan ............................... 58-224264

[51] Int. Cl.[4] ............................................ G01D 15/18

[52] U.S. Cl. ............................................... 346/140 R

[58] Field of Search ......................................... 346/140

[56] References Cited

U.S. PATENT DOCUMENTS 4,335,389 6/1982 Shirato ........................... 346/140 R 4,450,457 5/1984 Miyachi .......................... 346/140 R 4,458,256 7/1984 Shirato ............................... 346/140

*Primary Examiner*—Joseph W. Hartary

*Attorney, Agent, or Firm*—Fitzpatrick, Cella, Harper & Scinto

[57] ABSTRACT

A liquid jet recording head comprises an orifice for forming flying liquid droplets by ejecting liquid, a heat actuating portion communicated with the orifice and where thermal energy for forming liquid droplets is applied to the liquid, at least one pair of electrodes electrically connected with a resistive heater layer provided on a support, an electrothermal transducer disposed between said one pair of electrodes and constituting a heat generating portion, at least one part of said one pair of electrodes disposed opposite each other sandwiching an insulating layer, characterized in that at least one electrode of said one pair of electrodes and said insulating layer are not disposed under the heat generating portion.

12 Claims, 11 Drawing Figures

LIQUID JET RECORDING HEAD

BACKGROUND OF THE INVENTION

1. Field of the Invention

This invention relates to a liquid jet recording head which ejects liquid to produce flying liquid droplets to record.

2. Description of the Prior Art

Ink jet recording methods (liquid jet recording methods) have recently attracted attention since noise upon recording is very little and high speed recording is possible and, further, the recording can be made on plain paper without any special treatment such as fixation.

Among methods for example, a liquid jet recording method disclosed in Japanese patent Laid-open No. 51837/1979 and German patent Laid-open (DOLS)No. 2843064 is different from other liquid jet recording methods in that heat energy is applied to liquid to produce a driving force for ejecting liquid droplets. That is, the above-mentioned recording method comprises applying heat energy to a liquid to cause an abrupt increase in the volume of the liquid, ejecting the liquid from the orifice at the front of the recording head to form flying liquid droplets and attaching the droplets to a record receiving member to effect recording.

In particular, the liquid jet recording method disclosed in DOLS No. 2843064 can be not only effectively used for so-called "drop-on-demand" recording methods, but it also enables realization of a high density multi-orifice recording head of a full-line type, and therefore, images of high resolution and high quality can be produced at a high speed.

The recording head portion of an apparatus used for the above-mentioned recording method comprises a liquid ejecting portion constituted of an orifice for ejecting liquid and a liquid flow path containing, as a part of the construction, a heat actuating portion communicated with the orifice and applying heat energy to the liquid for ejecting liquid droplets, and an electrothermal transducer for generating heat energy.

The electrothermal transducer is provided with a pair of electordes and a resistive heater layer connected to the electrodes and having a region generating heat (heat generating portion) between the electrodes.

A typical embodiment of the structure of such liquid jet recording head is shown in FIG. 1 (*a*) and FIG. 1 (*b*).

FIG. 1 (*a*) is a partial front view of the liquid jet recording head viewed from the orifice side, and FIG. 1 (*b*) is a partial cross sectional view taken along the dot and dash line XY of FIG. 1 (*a*).

Recording head 100 is constituted of orifice 104 and liquid ejecting portion 105 formed by bonding the surface of substrate 102 provided with electrothermal transducer 101 to a grooved plate 103 having a predetermined number of grooves having a predetermined width and depth at a predetermined line density such that the grooved plate covers the substrate. In FIG. 1, the recording head has a plurality of orifices 104, but the present invention is not limited to such an embodiment and a recording head having a single orifice is also within the scope of the present invention.

Liquid ejecting portion 105 has orifice 104 ejecting liquid at the end and heat actuating portion 106 where heat energy generated by electrothermal transducer 101 is applied to liquid to form a bubble and an abrupt state change due to expansion and shrinkage of the volume occurs.

Heat actuating portion 106 is located above heat generating portion 107 of electrothermal transducer 101, and a heat actuating surface 108 where heat generating portion 107 contacts the liquid is the bottom suface of the heat actuating portion 106.

Heat generating portion 107 is constituted of lower layer 109 provided on substrate 102, common electrode 113 provided on lower layer 109, insulating layer 114 provided on common electrode 113, resistive heater layer 110 provided on insulating layer 114, and upper layer 111 provided on resistive heater layer 110. Resistive heater layer 110 is provided with electrodes 112 and 113 for flowing electric current to the layer 110 to generate heat. Insulating layer 114 is sandwiched in between electrodes 112 and 113. Electrode 112 is a selection electrode for selecting the heat generating portion of each liquid ejecting portion to generate heat, and electrode 113 is an electrode common to heat generating portions of liquid ejecting portions and is provided along the liquid flow path of each liquid ejecting portion.

Upper layer 111 serves to protect chemically and physically resistive heater layer 110 from the liquid at the heat generating portion 107 by isolating resistive heater layer 110 from the liquid in the liquid flow path at liquid ejecting portion 105. Upper layer 111 also serves to prevent electric leakage between adjacent electrodes. In particular, it is important to prevent electric leakage between selection electrodes and electrolytic corrosion of electrodes caused by electric current flowing in an electrode resulting from contact of an electrode under the liquid flow path with the liquid which happens by some cause. Therefore, such an upper layer 111 having a protective function is provided on at least an electrode which is disposed under a liquid flow path.

A liquid flow path provided in each liquid ejecting portion is communicated with a common liquid chamber (not shown) storing the liquid to be fed to the liquid flow path at the upstream, and in general, an electrode connected to the electrothermal transducer in the liquid ejecting portion is provided for reasons of design such that the electrode passes under the common liquid chamber at the upstream portion from the heat actuating portion. Therefore, the upper layer is also provided at the portion so as to prevent the electrode from contacting the liquid.

However, since an electrode passes under a heat generating portion in the prior art recording head, the material for the electrode is limited to that of high heat resistance, and since the insulating layer is formed to double as a heat accumulating layer, upon fabrication there are formed so many through-holes that the yield of the apparatus is low. In addition, since the prior art heat generating portion is composed of several layers as is clear from the above-mentioned examples and each layer is composed of a material different from material of other layers, the coefficient of thermal expansion is different from one another and when heat is frequently applied, an internal strain is accumulated resulting in the formation of cracks and poor durability.

SUMMARY OF THE INVENTION

An object of the present invention is to provide a liquid jet recording head free from the above-mentioned drawbacks.

Another object of the present invention is to provide a liquid jet recording head which has a general durability upon the frequent repeated use and the long time continuous use and can stably maintain the excellent liquid droplet forming characteristics as at the beginning for a long period of time.

A further object of the present invention is to provide a liquid jet recording head which can be fabricated with a high reliability.

According to the present invention, there is provided a liquid jet recording head comprising an orifice for forming flying liquid droplets by ejecting liquid, a heat actuating portion communicated with the orifice and where thermal energy (hereinafter, referred to as "heat energy") for forming liquid droplets is applied to the liquid, at least one pair of electrodes electrically connected with a resistive heater layer provided on a support, an electrothermal transducer disposed between said one pair of electrodes and constituting a heat generating portion, at least one part of said one pair of electrodes disposed opposite each other sandwiching an insulating layer, characterized in that at least one electrode of said one pair of electrodes and said insulating layer are not disposed under the heat generating portion.

BRIEF DESCRIPTION OF THE DRAWINGS

FIGS. 3A and 3B show the location of a third protective layer in accordance with an embodiment of the present invention.

DESCRIPTION OF THE PREFERRED EMBODIMENTS

The present invention will be described in detail referring to FIG. 2 (*a*)–FIG. 2 (*e*).

Figure 1A:
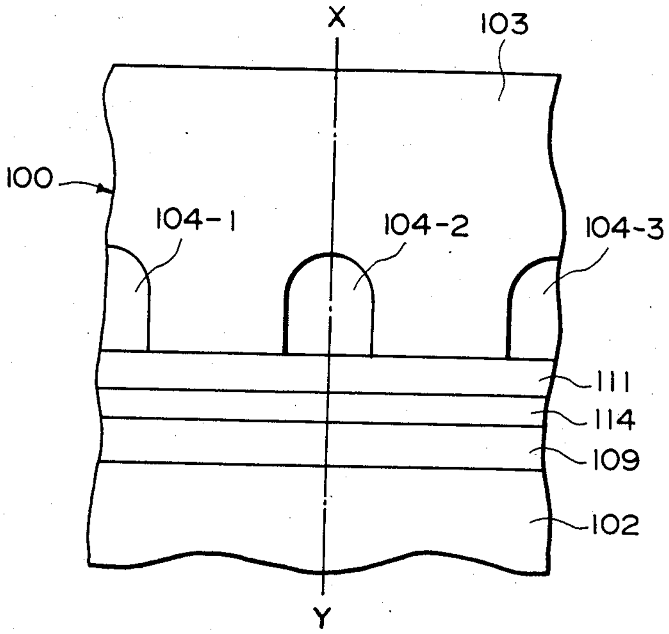
F I G. 1A PRIOR ART
FIG. 1 (*a*) and (*b*) refer to a conventional liquid jet recording head, FIG. 1 (*a*) shows schematically a partial front view and FIG. 1 (*b*) is a partial cross sectional view taken along a dot and dash line XY in FIG. 1(*a*)
Figure 1B:
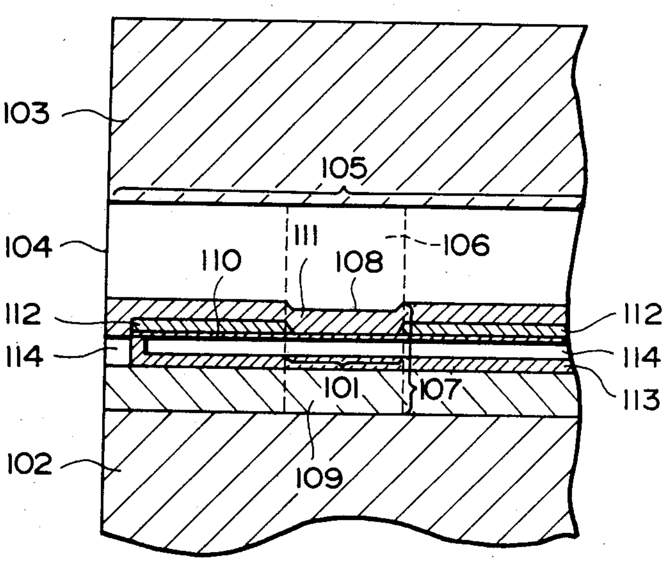
F I G. 1B PRIOR ART
Figure 2A:
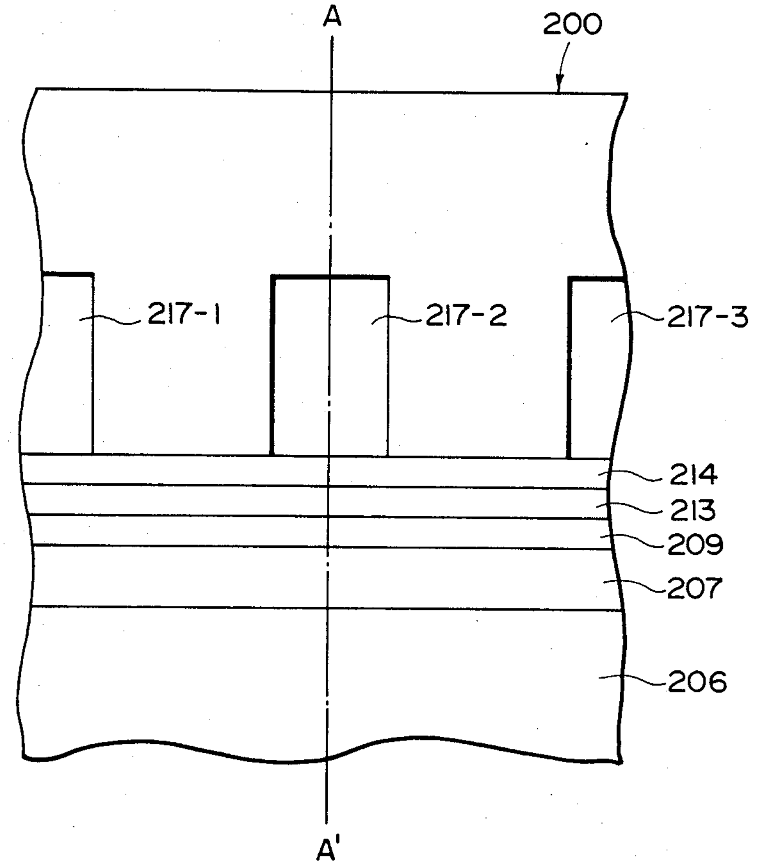
FIG. 2 (*a*), (*b*), (*c*), (*d*) and (*e*) refer to a liquid jet recording head according to the present invention, FIG. 2 (*a*) shows schematically a partial front view, FIG. 2 (*b*) is a partial cross-sectional view taken along a dot and dash line AA' in FIG. 2 (*a*), FIG. 2 (*c*) is a partial cross-sectional view taken along a dot and dash line BB' in FIG. 2 (*b*), FIG. 2 (*d*) is a substrate plan view taken along a dot and dash line CC' in FIG. 2 (*b*), and FIG. 2 (*e*) is a plan view of a substrate where the first protective layer and the second protective layer are removed.
Figure 2B:
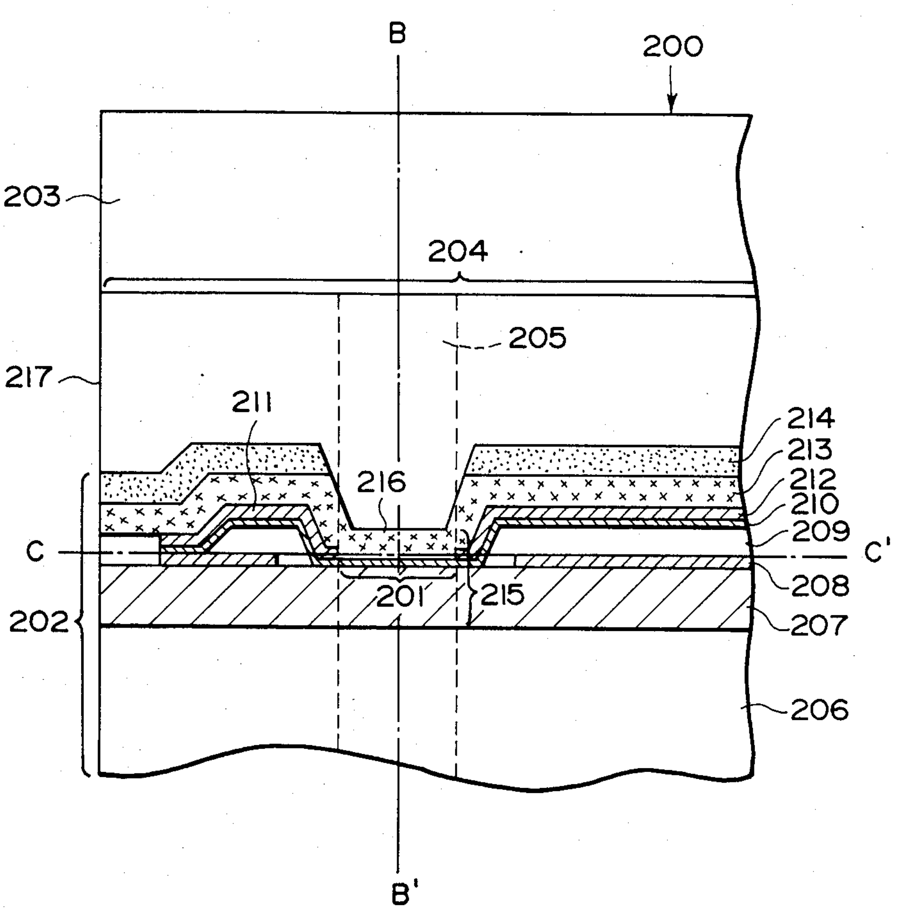
Figure 2C:
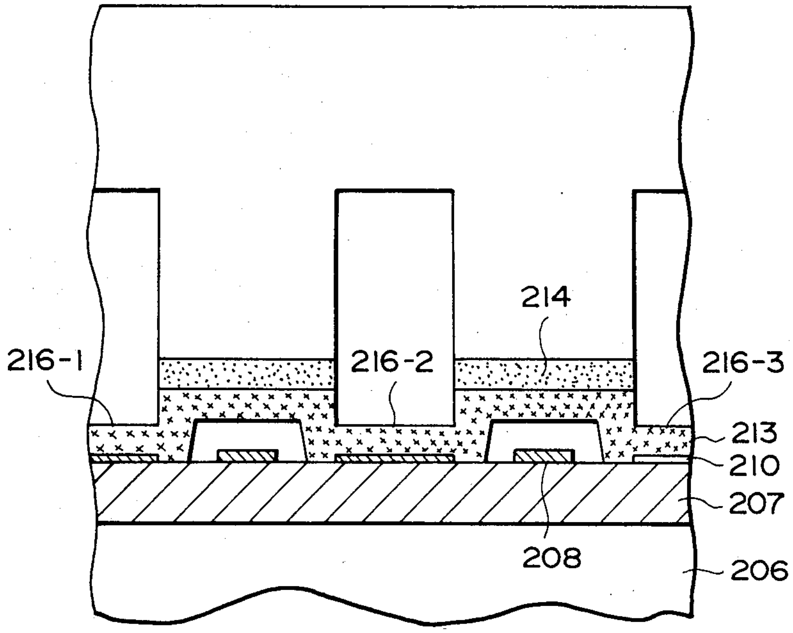
Figure 2D:
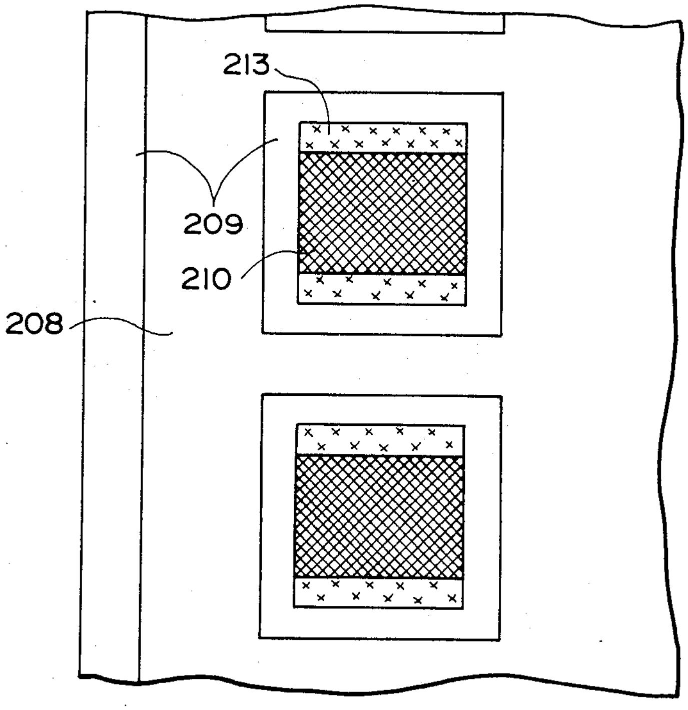
Figure 2E:
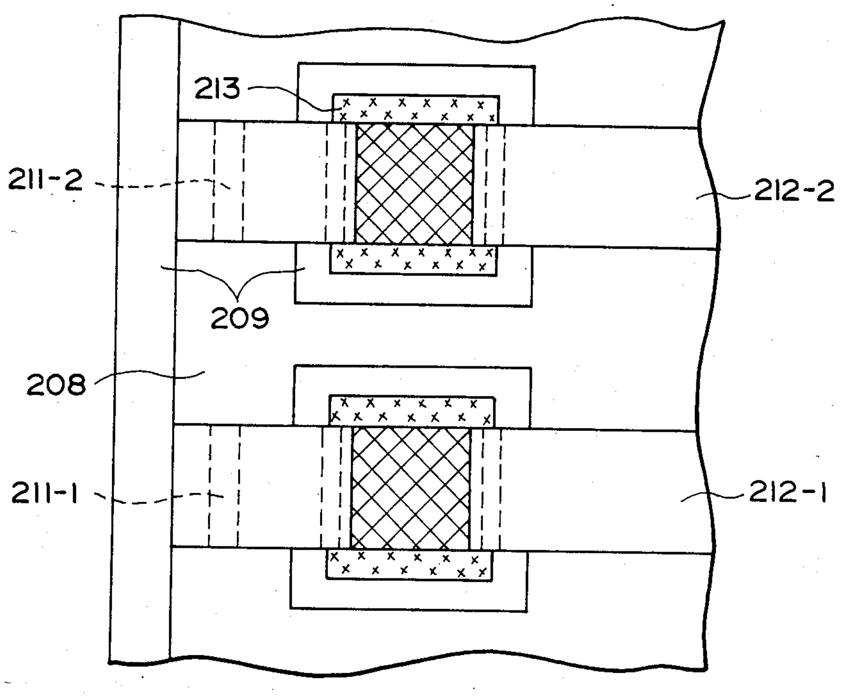
Figure 3A:
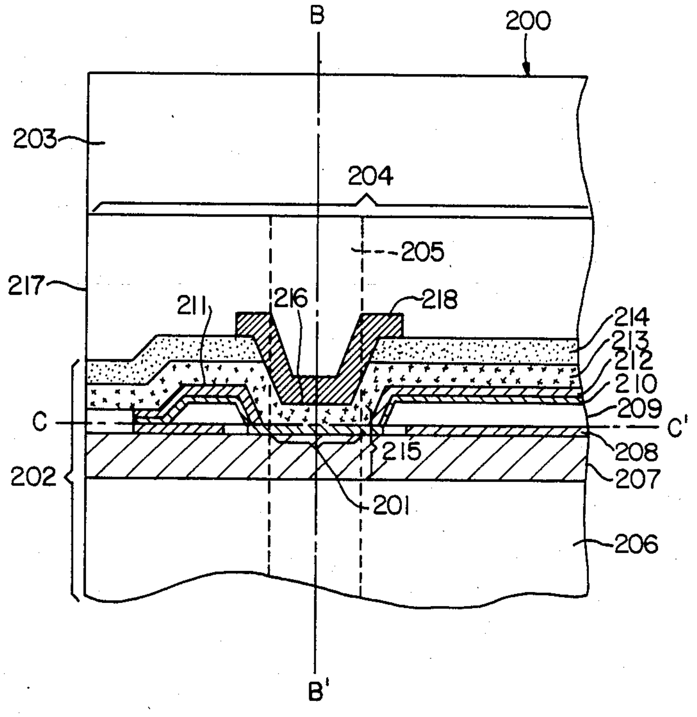
FIGS. 3A and B and 4A and B are partial sectional views of other embodiments of the present invention, in particular.
Figure 3B:
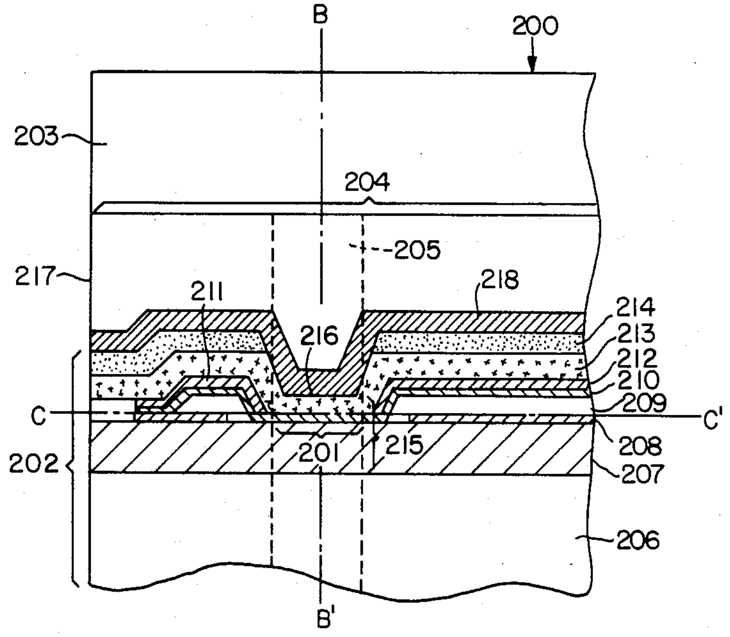

FIG. 2 (*a*) is a partial front view of a liquid jet recording head of the present invention viewed from the orifice side for explaining the main part of the structure of a preferable embodiment of the present invention and FIG. 2 (*b*) shows a partial cross-sectional view taken along a dot and dash line in FIG. 2 (*a*). FIG. 2 (*a*) and FIG. 2 (*b*) correspond to FIG. 1 (*a*) and FIG. 1 (*b*), respectively.

Liquid jet recording head 200 is mainly constituted of a substrate 202 provided with a predetermined number of electrothermal transducers 201 for liquid jet recording where heat energy is used for liquid ejection and a grooved plate 203 having a predetermined number of grooves corresponding to the above-mentioned electrothermal transducers 201.

Substrate 202 and grooved plate 203 are bonded at predetermined portions with adhesives or the like to form liquid flow path 204 defined by the portion of substrate 202 where electrothermal transducer 201 is provided and the groove of grooved plate 203, and the liquid flow path 204 has heat actuating portion 205.

Substrate 202 is constituted of support 206 composed of silicon, glass, ceramics or the like, lower layer 207 overlying support 206 and composed of $SiO_2$ or the like, common electrode 208, insulating layer 209, resistive heater layer 210 which is formed after removing a part of common electrode 208 and a part of insulating layer 209 corresponding to heat generating portion 215, selection electrodes 211 and 212 provided at the both sides of the heat generating portion on the upper surface of the resistive heater layer and along liquid flow path 204, first protective layer 213 covering the part of resistive heater layer 210 which is not covered and the selection electrodes 211 and 212 and second protective layer 214 provided on the surface of first protective layer except for the part of first protective layer corresponding to the heat generating portion. A through-hole is provided in insulating layer 209 near the orifice end portion so as to connect the selection electrode 211 with the common electrode 208.

Electrothermal transducer 201 comprises heat generating portion 215 as the main portion. The heat generating portion 215 is constituted of support 206, lower layer 207, resistive heater layer 210 and first protective layer 213 successively formed. The surface of first protective layer 213 (heat actuating surface 216) directly contacts the liquid filled in liquid flow path 204.

On the other hand, the surface of selection electrodes 211 and 212 is covered with first protective layer 213, and second protective layer 214 is provided on the first layer except for the part corresponding to the heat generating portion 215.

FIG. 2 (*c*) is a partial cross-sectional view o taken along a dot and dash line BB' in FIG. 2 (*b*). FIG. 2 (*d*) is a substrate plan view taken along a dot and dash line CC' in FIG. 2 (*b*). FIG. 2 (*e*) is a substrate plan view where first protective layer 213 and second protective layer 214 are removed.

In the case of liquid jet recording head 200 as shown in FIG. 2, second protective layer 214 is provided on the surface of selection electrode 211, but the present invention is not limited to such an embodiment. Second protective layer 214 on selection electrode 211 may be omitted. When second protective layer 214 is not provided on selection electrode, the step difference between the region from the heat actuating surface 216 to the orifice and the heat actuating surface 216 in liquid flow path 204 of the liquid ejecting portion is so small that the bottom surface of the liquid flow path is relatively smoother than that of the structure of FIG. 2 where the second layer is provided at the region from heat actuating surface 216 to the orifice as well. As a result, the flow of liquid is smooth and thereby the liquid droplets are stably formed. However, if the step difference between the surface position at the region from heat actuating surface 216 to the orifice and the surface position of heat actuating surface 216 is substantially negligibly small as compared with the distance between the upper surface of liquid flow path and heat actuating surface 216, the step difference does not affect so much the stability of liquid drop formation. Therefore, as far as the step difference is within the range as mentioned above, the second protective layer may or may not be provided at the region from heat actuating surface 216 to the orifice.

As materials constituting the first protective layer 213, there are preferably used inorganic insulating materials relatively excellent in thermal conductivity and heat resistance, for example, inorganic oxides such as $SiO_2$ and the like, transition metal oxides such as titamium oxide, vanadium oxide, niobium oxide, molybdenum oxide, tantalum oxide, tungsten oxide, chromium oxide, zirconium oxide, hafnium oxide, lanthanum oxide, yttrium oxide, manganese oxide and the like, metal oxides such as aluminum oxide, calcium oxide, strontium oxide, barium oxide, silicon oxide and the like and composites thereof (Composite is a combination of at least two types of inorganic oxides, transition metal oxides and metal oxides.), high resistance nitrides such as silicon nitride, aluminum nitride, boron nitride, tantalum nitride and the like and composites of these oxides and nitrides, and thin film materials, for example, semiconductors comprising amorphous silicon, amorphous selenium and the like which have low resistance as bulk, but may be made to have high resistance by a sputtering method, a CVD method, a vapor deposition method, a gas phase reaction method, a liquid coating method or the like.

The second protective layer 214 is composed of an organic insulating material which is excellent in prevention of liquid penetration and liquid resistance, and further has preferably the following characteristics:

(1) Good film shapeability,
(2) Dense structure and free from pinholes,
(3) Not swelled with and not dissolved in the ink,
(4) High insulating property when film-shaped,
(5) High heat resistance, and the like.

As the organic materials, there may also be used, for example, silicone resin, fluorine resin, aromatic polyamide, addition polymerization type polyimide, polybenzimidazole, metal chelate polymer, titanic acid ester, epoxy resin, phthalic resin, thermosetting phenolic resin, P-vinylphenolic resin, Zirox resin, triazine resin, BT resin (addition polymerized resin of triazine resin and bismaleimide) or the like. Alternatively, it is also possible to form the second protective layer 214 by vapor deposition of polyxylylene resin and derivatives thereof.

Further, the second protective layer 214 may also be formed by film shaping according to a plasma polymerization using various organic monomers such as thiourea, thioacetamide, vinyl ferrocene, 1,3,5-trichlorobenzene, chlorobenzene, styrene, ferrocene, pyroline, naphthalene, pentamethylbenzene, nitrotoluene, acrylonitrile, diphenyl selenide, p-toluidine, p-xylene, N,N-dimethyl-p-toluidine, toluene, aniline, diphenyl mercury, hexamethylbenzene, malononitrile, tetracyanoethylene, thiophene, benzeneselenol, tetrafluoroethylene, ethylene, N-nitrosodiphenylamine, acetylene, 1,2,4-trichlorobenzene, propane and the like.

However, when a recording head of a high density multi-orifice type is manufactured, apart from the above-mentioned organic materials, it is desirable to use organic materials capable of being very easily processed by a fine photolithography as materials for forming the second protective layer 214.

As examples of the orgahic materials, there may be preperably used, for example, polyimidoisoindoloquinazolinedione (trade name: PIQ, produced by Hitachi Kasei Co., Japan), polyimide resin (trade name: PYRALIN, produced by Du Pont, U.S.A.), cyclized polybutadiene (trade name: JSR-CBR, CBR-M901, Japan Synthetic Rubber Co., Japan), Photonith (trade name: produced by Toray Co., Japan), other photosensitive polyimide and the like.

In addition, a third protective layer 218 may be provided on the upper most surface. The role of third protective layer 218 is mainly to impart a liquid resistance and reinforce the mechanical strength. Third protective layer 218 is formed, as the upper most layer, on the almost whole surface such as the liquid flow path 204, the common liquid chamber and the like which are possibly in contact with the liquid. Third protective layer 218 is usually composed of a material which is tough, relatively excellent in mechanical strength, and adhesive and cohesive to first layer 213 and second layer 214, for example, metallic materials such as Ta and the like where layer 213 is composed of $SiO_2$. By providing, as the surface layer of substrate, the third protective layer 218 composed of an inorganic material which is relatively tough and has a mechanical strength, for example, metals, the shock due to cavitation caused upon ejecting liquid can be sufficiently absorbed and the life of electrothermal transducer 201 can be extended to a great extent.

As materials used for forming the third protective layer, in addition to Ta as mentioned above, there may be mentioned the elements of Group IIIa of the periodic Table such as Sc, Y and the like, the elements of Group IVa such as Ti, Zr, Hf and the like, the elements of Group Va such as V, Nb and the like, the elements of the Group VIa such as Cr, Mo, W and the like, the elements of Group VIII such as Fe, Co, Ni and the like, alloys of the above-mentioned metals such as Ti—Ni, Ta—W, Ta—Mo—Ni, Ni—Cr, Fe—Co, Ti—W, Fe—Ti, Fe—Ni, Fe—Cr, Fe—Ni—Cr and the like, borides of the above-mentioned metals such as Ti—B, Ta—B, Hf—B, W—B and the like, carbides of the above-mentioned metals such as Ti—C, Zr—C, V—C, Ta—C, Mo—C, Ni—C and the like, silicides of the above-mentioned metals such as Mo—Si, W—Si, Ta—Si and the like, nitrides of the above-mentioned metals such as Ti—N, Nb—N, Ta—N and the like. Using these materials, third protective layer 218 may be formed by the procedure such as a vapor deposition method, a sputtering method, a CVD method and the like. The protective layer 218 may be composed of the above materials, alone or in combination. Also, third protective layer 218 ay be formed by combining the above-mentioned material with the material for the first protective layer.

Lower layer 207 is provided so as to control mainly the transfer of heat generated at heat generating portion 215 to support 206. The construction material is selected and the layer thickness is designed in such a way that the heat generated at heat generating portion 215 flows more to the heat actuating portion 205 side than to other portions when heat energy is applied to the liquid at heat actuating portion 205 while the heat remaining at heat generating portion 215 flows rapidly to the support 206 side when the electric current to electrothermal transducer 201 is switched off.

As the material for constituting lower layer 207, there may be used, in addition to $SiO_2$ as mentioned above, inorganic materials represented by metal oxides such as zirconium oxide, tantalum oxide, magnesium oxide, aluminum oxide and the like.

As the material constituting resistive heater layer 210, there may be used most materials capable of generating heat as desired by flowing electric current.

As examples of the materials, there may be preferably used, for example, tantalum nitride, nichrome, silver-palladium alloy, silicon semiconductor, or a metal such as hafnium, lanthanum, zirconium, titanium, tantalum, tungsten, molybdenum, niobium, chromium, vanadium and the like, alloys thereof, borides thereof or the like.

Among the materials constituting the resistive heater layer 210, metal borides are especially excellent. Of these, hafnium boride is the best, and next to this compound there are zirconium boride, lanthanum boride, tantalum boride, vanadium boride and niobium boride with better characteristic in the order as mentioned.

Using the above-mentioned meterial, the resistive heater layer 210 may be formed by the procedure such as an electron beam method, a sputtering method and the like.

As the materials for constituting electrodes 208, 211 and 212, there may be effectively used most of conventional electrode materials, and there are mentioned, for example, Al, Ag, Au, Pt, Cu and the like. The electrodes may be formed at a predetermined position with a predetermined size, shape and thickness by means of vapor deposition or the like.

As the materials for constituting insulating layer 209, there may be used organic or inorganic insulating materials which can be easily formed on electrode 208 with a predetermined patterning and are pinholeless so as to prevent short circuit between electrode 208 and electrode 211 or 212. Examples of the insulating materials are a material composed of $SiO_2$, $Si_3N_4$ and the like according to a lift-off method polyimidoisoindoloquinazolinedione (tradename: PIQ, produced by Hitachi Kasei Co., Japan), polyimide resin (tradename: PYRALIN, produced by Du Pont, U.S.A.), cyclized polybutadiene (tradename: JSR-CBR, CBR-M901, Japan Synthetic Rubber Co., Japan), Photonith (tradename, produced by Toray Co., Japan), other photosensitive polyimide and the like.

As the materials for constituting the grooved plate 203 and the common liquid chamber provided at the upstream portion of heat actuating portion 205, there may be used most of the materials satisfying the following conditions: (i) the shape is hardly or not thermally affected during fabricating the recording head or under the circumstance of using the recording head; (ii) a fine precise processing can be applied thereto and the surface accuracy can be easily obtained as desired; and (iii) the resulting liquid paths can be processed to permit the liquid to flow smoothly in the paths.

Representative materials for the above-mentioned purpose are preferably ceramics, glass, metals, plastics, silicon wafer and the like, and in particular, glass and silicon wafer are more preferable since they are easily processed, and have an appropriate degree of heat resistance, coefficient of thermal expansion and thermal conductivity. It is desired to apply to the outer surface of the circumference of orifice 217 a water repellent treatment where the liquid is aqueous and an oil repellent treatment where the liquid is non-aqueous, so as to prevent the liquid from leaking and flowing to the outside portion of orifice 217.

Orifice 217 may be formed by adhering a photosensitive resin plate to substrate 202, forming a pattern by photolithography and then adhering the ceiling plate.

Figure 4A:
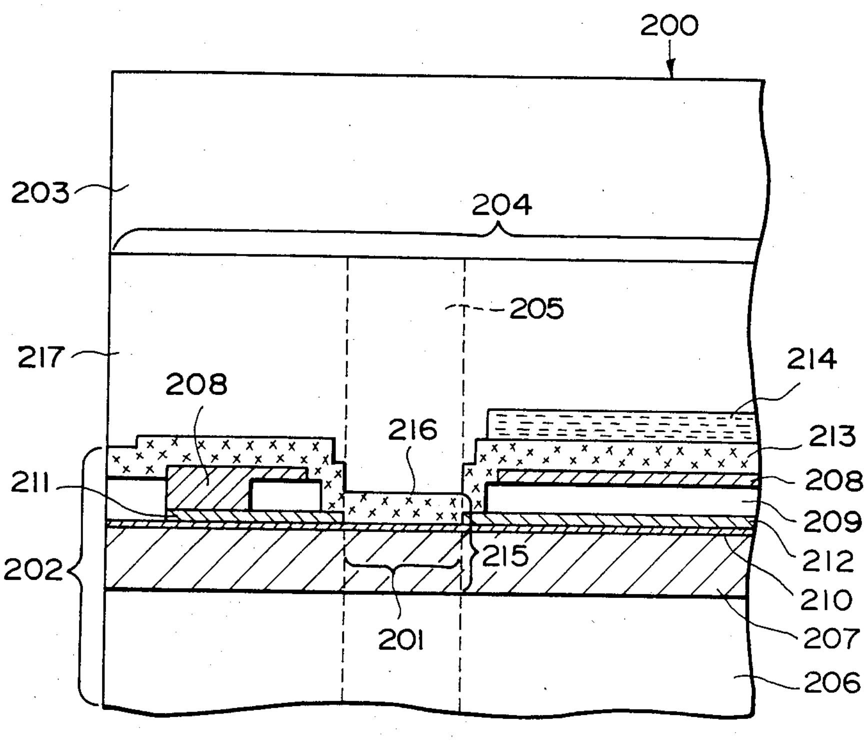
Figure 4B:
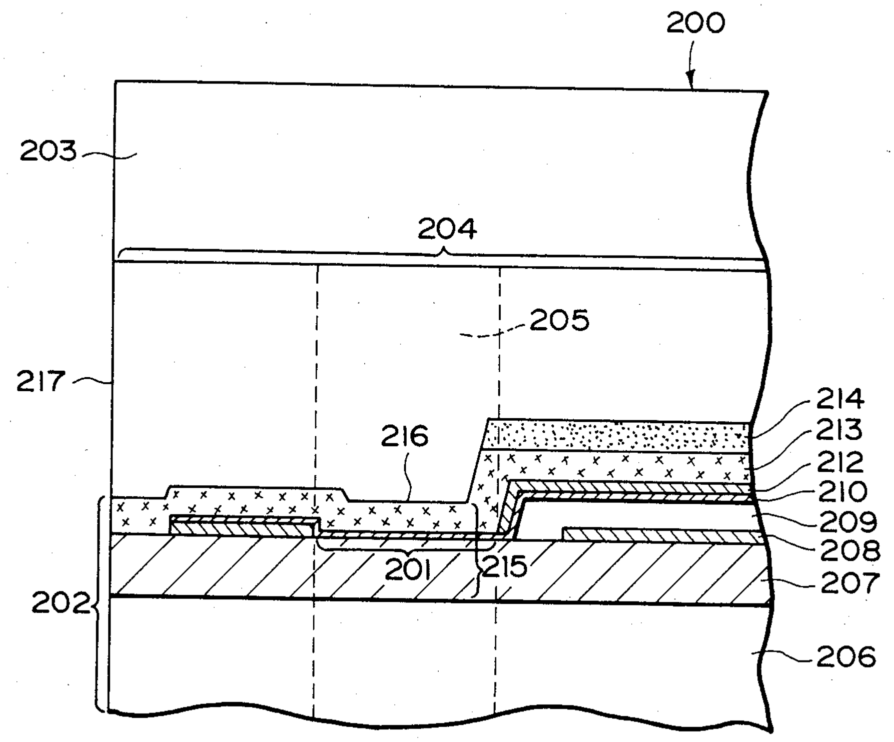

FIG. 4A and FIG. 4B show other embodiments of the present invention. FIG. 4A and FIG. 4B correspond to FIG. 2 (b) and like numerals show like parts.

Referring to FIG. 4A, lower layer 207 is formed on support 206. On lower layer 207 are successively upwards formed resistive heater layer 210, selection electrodes 211 and 212, insulating layer 209, and common electrode 208, and then the electrodes and insulating layer corresponding to heat generating portion 215 are removed by patterning. First protective layer 213 is formed so as to cover the electrodes, resistive heater layer and insulating layer, and then second protective layer 214 is provided only at a region from the heat generating portion 215 to the common liquid chamber along liquid flow path 204.

Referring to FIG. 4B, neither a selection electrode nor a second protective is formed at the region from heat generating portion 215 to orifice 217 and therefore, the surface step difference between the region from heat generating portion 215 to the orifice in the liquid ejecting portion and the heat actuating surface 16 is small.

The liquid jet recording head of the present invention is illustrated by referring to the following Example.

EXAMPLE

A liquid jet recording head as shown in FIG.2 was manufactured as shown below.

An $SiO_2$ film of 5 μm thick was formed by thermally oxidizing An Si wafer On the $SiO_2$ film, a common electrode 208 was formed by depositing Ti layer of 50 Å thick and Al layer of 5,000 Å thick by electron beam deposition. Then, the pattern of common electrode 208 as shown in FIG. 2(*d*) was formed by photolithographic steps and the circumference of a heat actuating surface was cut off. Size of the cut part was 30 μm in width and 150 μm in length.

An insulating layer 209 composed of Photonith (trade name: produced by Toray Co., Japan) of 1.5 μm thick was formed on the resulting member except for the circumference of the heat actuating surface (25 μm in width and 140 μm in length) and a contact hole of common electrode 208 and a selecting electrode 211 (30 μm in width and 20 μm in length).

As the next step, a resistive heater layer 210 composed of $HfB_2$ of 1500 Å thick was formed by sputtering and then Ti layer of 50 Å thick and Al layer of 5,000 Å thick were deposited by electron beam deposition. The patterns of selecting electrodes 211 and 212 as shown in FIG. 2(*e*) were formed by photolithographic steps and size of the heat actuating surface was 25 μm in width and 140 μm in length. The resistance was 150 ohm, including the resistance of Al electrode.

First protective layer 213 composed of $SiO_2$ of 2.0 μm thick was deposited over the whole surface of the resulting member by a magnetron type high rate sputtering method. Then, second protective layer 214 composed of Photonith (trade name: produced by Toray Co., Japan) of 1.5 μm thick was formed by photolithography on the resulting member except for the circumference of the heat actuating surface and thereby a substrate was manufactured.

A grooved glass plate was adhered on a predetermined place of the substrate. That is, as shown in FIG. 2(*b*), the grooved glass plate for forming an ink-introducing flow path and the heat actuating portion (size of the groove: 50 μm in width, 50 μm in depth, and 2 mm in length) adhered to the substrate.

As described above, a high density multi-nozzle recording head of 25 Pel was manufactured.

The resulting recording head had a higher density than the prior art recording head. Further, the recording head has a general durability upon frequent repeated use and long time continuous use and can stably maintain excellent liquid droplet forming characteristics, as at the beginning, for a long period of time.

What is claimed is:

1. A liquid jet recording head comprising:

a supporting member;

a first electrode layer disposed on said supporting member and having openings therein corresponding to respective liquid flow paths of the recording head;

an insulating layer disposed on said first electrode layer and having openings therein corresponding to said openings in said first electrode layer;

a resistive heater layer disposed on said insulating layer, and on said supporting member through said openings in said first electrode layer and said insulating layer, to provide a heat generating portion for each liquid flow path; and a second electrode layer disposed on said resistive heater layer in electrical contact therewith and having openings therein corresponding to said openings in said first electrode layer and said insulating layer, said second electrode layer being electrically connected to said first electrode layer to provide respective electrical circuits through said heat generating potions for actuation thereof selectively to eject liquid droplets from orifices corresponding to the respective liquid flow paths.

2. A liquid jet recording head as in claim 1 wherein said first electrode layer includes a continuous layer underlying plural liquid flow paths and said resistive heater layer and said second electrode layer include plural strips each inderlying a respective liquid flow path.

3. A liquid jet recording head as in claim 1 further comprising a plate member attached to said supporting member to provide plural orificis and plural liquid flow paths in communication with respective said orifices.

4. A liquid jet recording head according to claim 3 wherein there is provided a common chamber for storing liquid to be supplied to said liquid flow paths.

5. A liquid jet recording head according to claim 1 wherein said supporting member includes a support having an insulating layer thereon.

6. A liquid jet recording head according to claim 1 wherein a protective layer is provided on the liquid flow path side of said electrode layers and said resistive heater layer.

7. A liquid jet recording head according to claim 6 wherein said protective layer comprises a continuous first protective layer covering said heat generating portions and a continuous second protective layer having openings at said heat generating portions.

8. A liquid jet recording head according to claim 7 wherein a third protective layer is provided on the uppermost surface layer.

9. A liquid jet recording comprising:

a supporting member;

a resistive heater layer disposed on said supporting member;

a first electrode layer disposed on said resistive heater layer in electrical contact therewith having openings therein corresponding to respective liquid flow paths of the recording head to provide a heat generating portion for each liquid flow path;

an insulating layer disposed on said first electrode layer and having openings therein corresponding to said openings in said first electrode layer; and a second electrode layer disposed on said insulating layer and having openings therein corresponding to said openings in said first electrode layer and said insulating layer, said second electrode layer being electrically connected to said first electrode layer to provide respective electrical circuits through said heat generating portions for actuation thereof selectively to eject liquid droplets from orifices corresponding to the respective liquid flow paths.

10. A liquid jet recording head as in claim 9 further comprising a plate member attached to said supporting member to provide plural orifices and plural liquid flow paths in communication with respective said orifices.

11. A liquid jet recording head comprising:

a supporting member;

a first electrode layer disposed on said supporting member and having openings therein corresponding to respective liquid flow paths of the recording head;

an insulating layer disposed on said first electrode layer;

a resistive heater layer disposed on said insulating layer, on said first electrode layer in electrical contact therewith and on said supporting member through said openings in said first electrode layer, to provide a heat generating portion for each liquid flow path, wherein said insulating layer is disposed between said resistive heater layer and said first electrode layer and only upstream from said heat generating portion, said resistive heater layer being disposed on said first electrode layer downstream of said heat generating portions; and a second electrode layer disposed on and in electrical contact with said resistive heater layer upstream of said heat generating portions to provide respective electrical circuits through said heat generating portions and said first electrode layer donwstream of said heat generating portions for actuation thereof selectively to eject liquid droplets from orifices corresponding to the respective liquid flow paths.

12. A liquid jet recording head as in claim 11 further comprising a plate member attached to said supporting member to provide plural orifices and plural liquid flow paths in communication with respective said orifices.

* * * * *

UNITED STATES PATENT AND TRADEMARK OFFICE

CERTIFICATE OF CORRECTION

PATENT NO. : 4,686,544

DATED : August 11, 1987

INVENTOR(S) : MASAMI IKEDA, ET AL.

It is certified that error appears in the above-identified patent and that said Letters Patent is hereby corrected as shown below:

COLUMN 1

Line 16, "Among methods for" should read --Among such methods, for--.
Line 45, "electordes" should read --electrodes--.

COLUMN 4

Line 38, delete "o".

COLUMN 5

Line 8, "titamium" should read --titanium--.
Line 65, "orgahic" should read --organic--.
Line 66, "preperably" should read --preferably--.

COLUMN 6

Line 19, "of substrate, the third" should read --of the substrate, third--.
Line 32, delete "the" (first occurrence).
Line 48, "The" should read --Third--.
Line 50, "ay" should read --may--.

COLUMN 7

Line 16, "meterial," should read --material,--.
Line 34, "method" should read --method, or--.

CERTIFICATE OF CORRECTION

PATENT NO. : 4,686,544 Page 2 of 3
DATED : August 11, 1987
INVENTOR(S) : MASAMI IKEDA, ET AL.

It is certified that error appears in the above-identified patent and that said Letters Patent is hereby corrected as shown below:

COLUMN 8

Line 17, "protective is" should read --protective layer is--.
Line 21, "16" should read --216--.
Line 29, "An" should read --an--.
Line 29, "On" should read --on--.

COLUMN 9

Line 6, "long time" should read --long-time--.
Line 31, "tricaily" should read --trically--.
Line 40, "inderlying" should read --underlying--.
Line 45, "orificis" should read --orifices--.

UNITED STATES PATENT AND TRADEMARK OFFICE

CERTIFICATE OF CORRECTION

PATENT NO. : 4,686,544

DATED : August 11, 1987

INVENTOR(S) : MASAMI IKEDA, ET AL.

It is certified that error appears in the above-identified patent and that said Letters Patent is hereby corrected as shown below:

COLUMN 10

Line 4, "recording comprising:" should read --recording head comprising:--.

Signed and Sealed this

Fifteenth Day of March, 1988

*Attest:*

DONALD J. QUIGG

*Attesting Officer*

*Commissioner of Patents and Trademarks*